(12) United States Patent
Chang et al.

(10) Patent No.: US 8,928,640 B2
(45) Date of Patent: Jan. 6, 2015

(54) LIQUID CRYSTAL DISPLAY HAVING ADAPTIVE PULSE SHAPING CONTROL MECHANISM

(75) Inventors: Meng-Sheng Chang, Hsin-Chu (TW); Hsiao-Chung Cheng, Hsin-Chu (TW); Tien-chin Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 248 days.

(21) Appl. No.: 13/304,273

(22) Filed: Nov. 23, 2011

(65) Prior Publication Data

US 2013/0088470 A1 Apr. 11, 2013

(30) Foreign Application Priority Data

Oct. 5, 2011 (TW) .............................. 100136168 A (51) Int. Cl.
*G09G 3/36* (2006.01)
(52) U.S. Cl.
CPC ............ *G09G 3/3677* (2013.01); *G09G 3/3655* (2013.01); *G09G 2320/0285* (2013.01)
USPC ................ 345/208; 345/87; 345/94; 345/100
(58) Field of Classification Search
CPC .. G09G 3/3648; G09G 3/3614; G09G 3/3677
USPC .................... 345/87–100, 204–208, 211–214
See application file for complete search history.

(56) References Cited

U.S. PATENT DOCUMENTS

| 7,652,649 | B2 | 1/2010 | Huang | |
|---|---|---|---|---|
| 2008/0117200 | A1* | 5/2008 | Nakatsuka | 345/214 |
| 2008/0173719 | A1 | 7/2008 | Wang | |
| 2009/0109197 | A1* | 4/2009 | Tu et al. | 345/204 |
| 2009/0189883 | A1* | 7/2009 | Chung et al. | 345/213 |
| 2009/0289884 | A1* | 11/2009 | Yanagi et al. | 345/92 |
| 2009/0315872 | A1 | 12/2009 | Ikeda | |
| 2010/0245333 | A1* | 9/2010 | Hsu et al. | 345/213 |
| 2011/0169796 | A1* | 7/2011 | Guo et al. | 345/208 |
| 2012/0293466 | A1* | 11/2012 | Jeong et al. | 345/204 |

* cited by examiner

*Primary Examiner* — Srilakshmi K Kumar
*Assistant Examiner* — James Nokham
(74) *Attorney, Agent, or Firm* — Winston Hsu; Scott Margo (57) ABSTRACT

A liquid crystal display having adaptive pulse shaping control mechanism includes a first gate driver for providing a first gate signal based on a first modulation voltage, a second gate driver for providing a second gate signal based on a second modulation voltage, a first pixel array unit for illustrating image according to the first gate signal, a second pixel array unit for illustrating image according to the second gate signal, a timing controller for performing a pulse compare operation over the first and second gate signals so as to generate a first shaping control signal and a second shaping control signal, a first gate pulse modulation unit for providing the first modulation voltage according to the first shaping control signal, and a second gate pulse modulation unit for providing the second modulation voltage according to the second shaping control signal.

7 Claims, 9 Drawing Sheets

LIQUID CRYSTAL DISPLAY HAVING ADAPTIVE PULSE SHAPING CONTROL MECHANISM

CROSS-REFERENCE TO RELATED APPLICATIONS

This application claims the benefit of Taiwan Patent Application No. 100136168, filed Oct. 5, 2011, now issued as Taiwan Patent No. 1440011, and is incorporated herein by reference in its entirety.

BACKGROUND

1. Technical Field

The disclosure relates to a liquid crystal display, and more particularly, to a liquid crystal display having adaptive pulse shaping control mechanism.

2. Description of the Related Art

Liquid crystal displays (LCDs) have advantages of a thin profile, low power consumption, and low radiation, and are broadly adopted for application in media players, mobile phones, personal digital assistants (PDAs), computer displays, and flat screen televisions. The operation of a liquid crystal display is featured by modulating the voltage drop across opposite sides of a liquid crystal layer for twisting the angles of liquid crystal molecules in the liquid crystal layer so that the transmittance of the liquid crystal layer can be controlled for illustrating image with the aid of light source provided by a backlight module. In general, a liquid crystal display having gate pulse shaping mechanism comprises a plurality of pixel units, a source driver, a plurality of gate drivers, and a gate pulse modulation unit. The source driver is employed to provide plural data signals furnished to the pixel units. The gate pulse modulation unit is utilized for providing a gate signal modulation voltage according to a shaping control signal and a high-level gate signal reference voltage. The gate drivers are put in use for generating plural gate signals furnished to the pixel units according to the gate signal modulation voltage and a low-level gate signal reference voltage. The pixel units are employed to illustrate image through performing pixel voltage writing operations based on the data signals and the gate signals. However, while inputting the gate signal modulation voltage to the gate drivers, an occurrence of the shaping interval delay difference is likely to incur different pulse falling depths corresponding to different gate signals, which in turn causes an occurrence of different feed-through voltages. That is, the problem of image flickering and color-shift phenomena cannot be completely solved by the prior-art gate pulse shaping mechanism, and the image quality of the liquid crystal display cannot be enhanced significantly.

SUMMARY

In accordance with one embodiment of the present invention, a liquid crystal display having adaptive pulse shaping control mechanism is provided for solving the problem of image flickering and color-shift phenomena on LCD screen. The liquid crystal display comprises a source driver for providing plural data signals, a first gate driver for providing a first gate signal set according to a first gate signal modulation voltage, a second gate driver for providing a second gate signal set according to a second gate signal modulation voltage, a pixel array, a timing controller, a first gate pulse modulation unit, and a second gate pulse modulation unit. The pixel array comprises a first pixel array unit and a second pixel array unit. The first pixel array unit, electrically connected to the source driver and the first gate driver, is utilized for illustrating image according to the data signals and the first gate signal set. The second pixel array unit, electrically connected to the source driver and the second gate driver, is utilized for illustrating image according to the data signals and the second gate signal set. The timing controller, electrically connected to the pixel array, is employed to perform a gate pulse compare operation over a first gate signal of the first gate signal set and a second gate signal of the second gate signal set for generating a first shaping control signal and a second shaping control signal. The first gate pulse modulation unit, electrically connected to the timing controller and the first gate driver, is put in use for providing the first gate signal modulation voltage furnished to the first gate driver according to the first shaping control signal. The second gate pulse modulation unit, electrically connected to the timing controller and the second gate driver, is put in use for providing the second gate signal modulation voltage furnished to the second gate driver according to the second shaping control signal.

In accordance with another embodiment of the present invention, a liquid crystal display having adaptive pulse shaping control mechanism is provided for solving the problem of image flickering and color-shift phenomena on LCD screen. The liquid crystal display comprises a source driver for providing plural data signals, a first gate driver for providing a first gate signal set according to a gate signal modulation voltage, a second gate driver for providing a second gate signal set according to the gate signal modulation voltage, a pixel array, a timing controller, and a gate pulse modulation unit. The pixel array comprises a first pixel array unit and a second pixel array unit. The first pixel array unit, electrically connected to the source driver and the first gate driver, is utilized for illustrating image according to the data signals and the first gate signal set. The second pixel array unit, electrically connected to the source driver and the second gate driver, is utilized for illustrating image according to the data signals and the second gate signal set. The timing controller, electrically connected to the pixel array, is employed to perform a gate pulse compare operation over a first gate signal of the first gate signal set and a second gate signal of the second gate signal set for generating a shaping control signal. The gate pulse modulation unit, electrically connected to the timing controller, the first gate driver and the second gate driver, is put in use for providing the gate signal modulation voltage furnished to the first and second gate drivers according to the shaping control signal. In the operation of the liquid crystal display, the timing controller outputs the shaping control signal having a first shaping interval and the gate pulse modulation unit provides the gate signal modulation voltage based on the shaping control signal having the first shaping interval when the first gate driver is enabled to output plural gate pulses of the first gate signal set. Alternatively, the timing controller outputs the shaping control signal having a second shaping interval and the gate pulse modulation unit provides the gate signal modulation voltage based on the shaping control signal having the second shaping interval when the second gate driver is enabled to output plural gate pulses of the second gate signal set.

Still, in accordance with another embodiment of the present invention, a liquid crystal display having adaptive pulse shaping control mechanism is provided for solving the problem of image flickering and color-shift phenomena on LCD screen. The liquid crystal display comprises a source driver for providing a first data signal set and a second data signal set, a first gate driver for providing a first gate signal set according to a first gate signal modulation voltage, a second gate driver for providing a second gate signal set according to a second gate signal modulation voltage, a pixel array, a timing controller, a first gate pulse modulation unit, and a second gate pulse modulation unit. The pixel array comprises a first pixel array unit and a second pixel array unit. The first pixel array unit, electrically connected to the source driver and the first gate driver, is utilized for illustrating image according to the first data signal set, the first gate signal set and a first common voltage. The second pixel array unit, electrically connected to the source driver and the second gate driver, is utilized for illustrating image according to the second data signal set, the second gate signal set and a second common voltage. The timing controller, electrically connected to the first and second pixel array units, is employed to performing a common voltage compare operation over the first and second common voltages for generating a first shaping control signal and a second shaping control signal. The first gate pulse modulation unit, electrically connected to the timing controller and the first gate driver, is put in use for providing the first gate signal modulation voltage furnished to the first gate driver according to the first shaping control signal. The second gate pulse modulation unit, electrically connected to the timing controller and the second gate driver, is put in use for providing the second gate signal modulation voltage furnished to the second gate driver according to the second shaping control signal.

Further, in accordance with another embodiment of the present invention, a liquid crystal display having adaptive pulse shaping control mechanism is provided for solving the problem of image flickering and color-shift phenomena on LCD screen. The liquid crystal display comprises a source driver for providing a first data signal set and a second data signal set, a first gate driver for providing a first gate signal set according to a gate signal modulation voltage, a second gate driver for providing a second gate signal set according to the gate signal modulation voltage, a pixel array, a timing controller, and a gate pulse modulation unit. The pixel array comprises a first pixel array unit and a second pixel array unit. The first pixel array unit, electrically connected to the source driver and the first gate driver, is utilized for illustrating image according to the first data signal set, the first gate signal set and a first common voltage. The second pixel array unit, electrically connected to the source driver and the second gate driver, is utilized for illustrating image according to the second data signal set, the second gate signal set and a second common voltage. The timing controller, electrically connected to the first and second pixel array units, is employed to perform a common voltage compare operation over the first and second common voltages for generating a shaping control signal. The gate pulse modulation unit, electrically connected to the timing controller, the first gate driver and the second gate driver, is put in use for providing the gate signal modulation voltage furnished to the first and second gate drivers according to the shaping control signal. In the operation of the liquid crystal display, the timing controller outputs the shaping control signal having a first shaping interval and the gate pulse modulation unit provides the gate signal modulation voltage based on the shaping control signal having the first shaping interval when the first gate driver is enabled to output plural gate pulses of the first gate signal set. Alternatively, the timing controller outputs the shaping control signal having a second shaping interval and the gate pulse modulation unit provides the gate signal modulation voltage based on the shaping control signal having the second shaping interval when the second gate driver is enabled to output plural gate pulses of the second gate signal set.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, some embodiments of the present invention will be described in detail with reference to the accompanying drawings. Here, it is to be noted that the present invention is not limited thereto.

Figure 1:
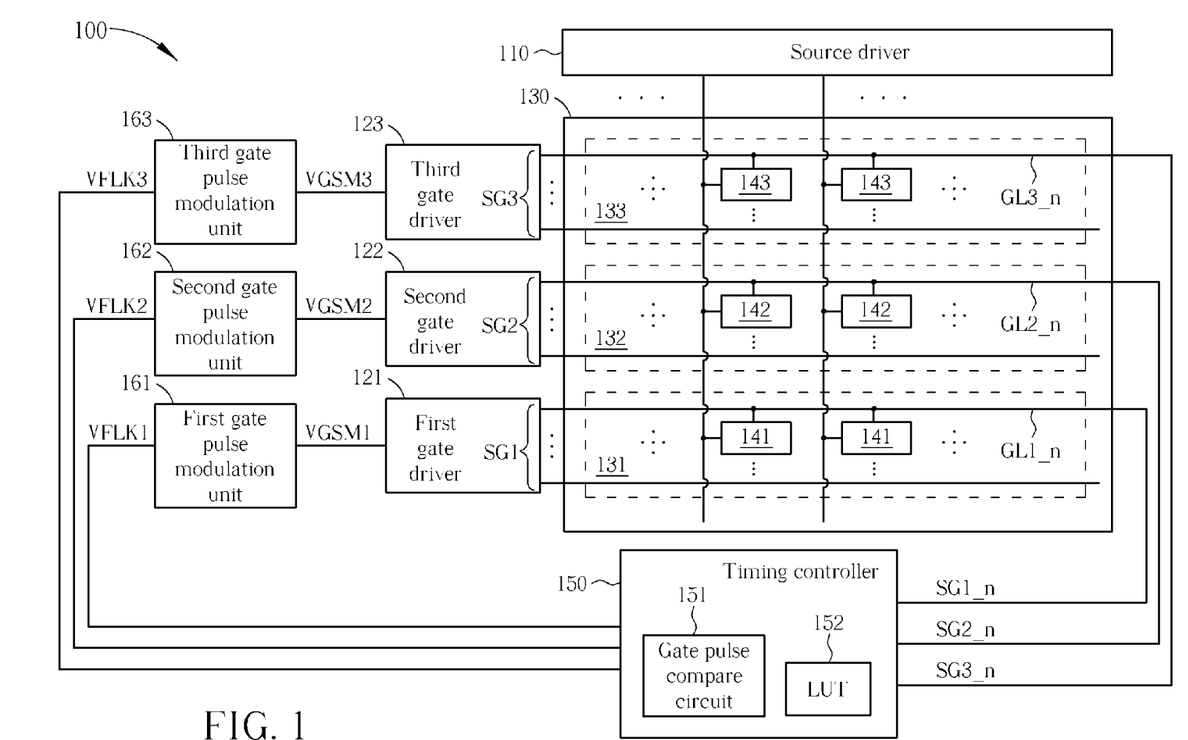
FIG. 1 is a schematic diagram showing a liquid crystal display having adaptive pulse shaping control mechanism in accordance with a first embodiment of the present invention.

FIG. 1 is a schematic diagram showing a liquid crystal display having adaptive pulse shaping control mechanism in accordance with a first embodiment of the present invention. As shown in FIG. 1, the liquid crystal display 100 comprises a source driver 110, a first gate driver 121, a second gate driver 122, a third gate driver 123, a pixel array 130, a timing controller 150, a first gate pulse modulation unit 161, a second gate pulse modulation unit 162, and a third gate pulse modulation unit 163. The source driver 110 is employed to provide a plurality of data signals. The first gate driver 121 is utilized for providing a first gate signal set SG1 according to a first gate signal modulation voltage VGSM1. The second gate driver 122 is utilized for providing a second gate signal set SG2 according to a second gate signal modulation voltage VGSM2. The third gate driver 123 is utilized for providing a third gate signal set SG3 according to a third gate signal modulation voltage VGSM3. The pixel array 130 includes a first pixel array unit 131, a second pixel array unit 132 and a third pixel array unit 133. The first pixel array unit 131, electrically connected to the source driver 110 and the first gate driver 121, comprises a plurality of first pixel units 141 for illustrating image according to plural data signals and the first gate signal set SG1. The second pixel array unit 132, electrically connected to the source driver 110 and the second gate driver 122, comprises a plurality of second pixel units 142 for illustrating image according to plural data signals and the second gate signal set SG2. The third pixel array unit 133, electrically connected to the source driver 110 and the third gate driver 123, comprises a plurality of third pixel units 143 for illustrating image according to plural data signals and the third gate signal set SG3.

The timing controller 150 is electrically connected to the pixel array 130 for receiving a first gate signal SG1_n of the first gate signal set SG1, a second gate signal SG2_n of the second gate signal set SG2 and a third gate signal SG3_n of the third gate signal set SG3. Further, the timing controller 150 is utilized for performing a gate pulse compare operation over the first gate signal SG1_n, the second gate signal SG2_n and the third gate signal SG3_n so as to adjust the shaping interval lengths of a first shaping control signal VFLK1, a second shaping control signal VFLK2 and a third shaping control signal VFLK3. In one embodiment, the spacing between a first gate line GL1_n for transmitting the first gate signal SG1_n and a second gate line GL2_n for transmitting the second gate signal SG2_n is substantially identical to the spacing between the second gate line GL2_n and a third gate line GL3_n for transmitting the third gate signal SG3_n. The timing controller 150 includes a gate pulse compare circuit 151 for performing the gate pulse compare operation.

Figure 2:
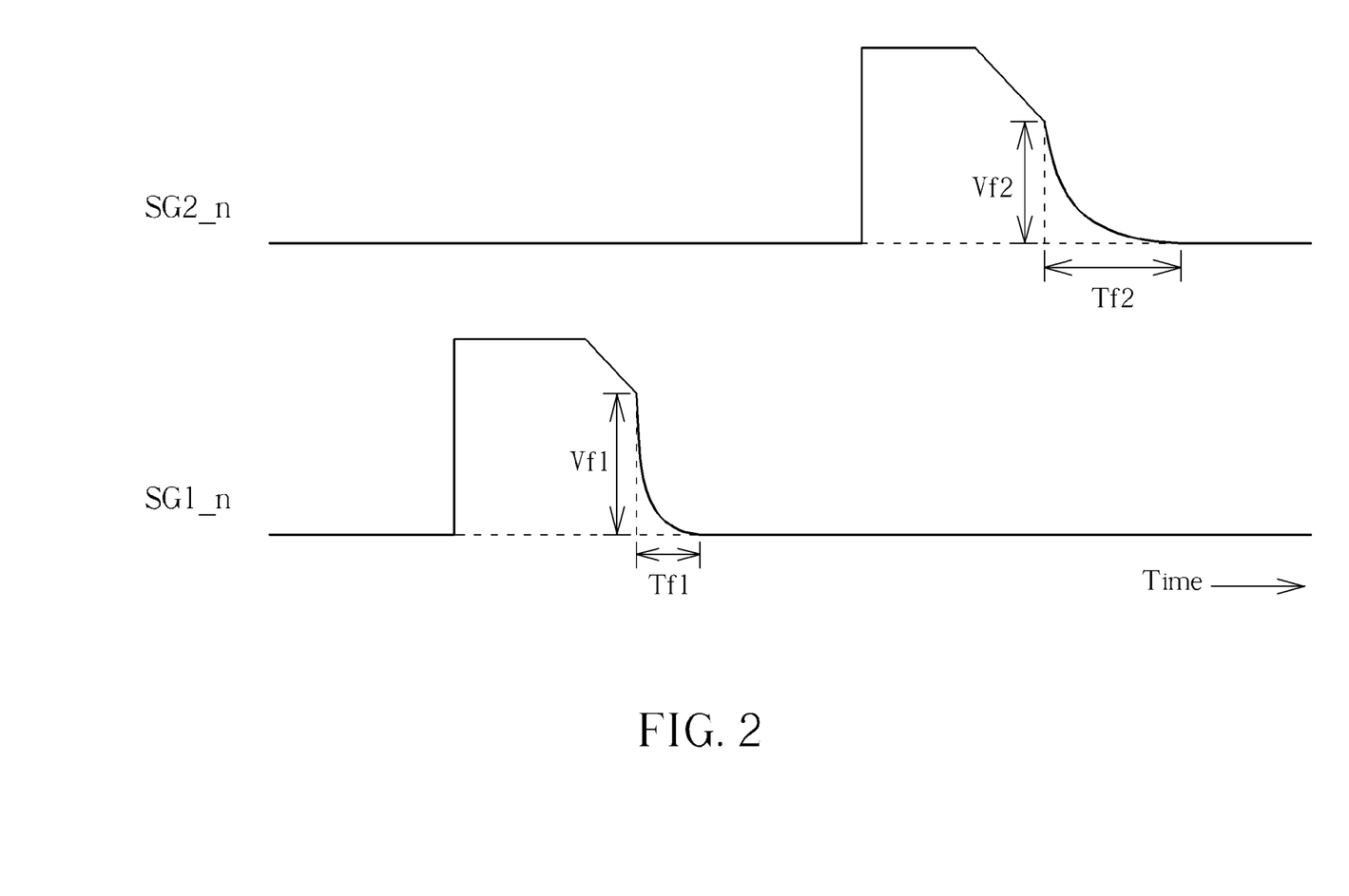
FIG. 2 is a waveform diagram schematically showing the gate pulses of the gate signals illustrated in FIG. 1, having time along the abscissa.

FIG. 2 is a waveform diagram schematically showing the gate pulses of the gate signals illustrated in FIG. 1, having time along the abscissa. Referring to FIG. 2 in conjunction with FIG. 1, since the spacing between the timing controller 150 and the second pixel array unit 132 is greater than the spacing between timing controller 150 and the first pixel array unit 131, the influence of line capacitance/resistance on the second gate signal SG2_n is greater than that on the first gate signal SG1_n due to longer signal transmitting distances, and the pulse voltage falling time Tf2 of the gate pulse of the second gate signal SG2_n is therefore greater than the pulse voltage falling time Tf1 of the gate pulse of the first gate signal SG1_n. Besides, since the shaping interval delay of inputting the first shaping control signal VFLK1 to the first gate pulse modulation unit 161 is less than the shaping interval delay of inputting the second shaping control signal VFLK2 to the second gate pulse modulation unit 162, the pulse falling depth Vf1 of the gate pulse of the first gate signal SG1_n is greater than the pulse falling depth Vf2 of the gate pulse of the second gate signal SG2_n, i.e. longer pulse voltage falling time Tf2 is corresponding to smaller pulse falling depth Vf2.

With the above in mind, concerning the operation of the timing controller 150, if the pulse voltage falling time Tf1 of the first gate signal SG1_n is shorter than the pulse voltage falling time Tf2 of the second gate signal SG2_n, the pulse falling depth Vf1 of the first gate signal SG1_n is estimated to be greater than the pulse falling depth Vf2 of the second gate signal SG2_n, and the timing controller 150 is then employed to lengthen the shaping interval of the first shaping control signal VFLK1 for decreasing the pulse falling depth Vf1, and/or to shorten the shaping interval of the second shaping control signal VFLK2 for increasing the pulse falling depth Vf2, thereby substantially equalizing the pulse falling depths of the first gate signal SG1_n and the second gate signal SG2_n after performing the shaping interval adjusting operation. The operations of gate pulse comparison and shaping interval adjustment for other gate signals can be inferred by analogy. In the embodiment shown in FIG. 1, the timing controller 150 further comprises a lookup table (LUT) 152 for providing a relationship between the difference of pulse voltage falling times and the adjusting amount of shaping interval, such that the timing controller 150 may generate the shaping control signals VFLK1-VFLK3 according to the comparison result of the gate pulse compare circuit 151 in conjunction with the relationship of the lookup table 152.

In the structure embodiment of the liquid crystal display 100 shown in FIG. 1, the first gate signal SG1_n, the second gate signal SG2_n and the third gate signal SG3_n are respectively inputted to the first pixel array unit 131, the second pixel array unit 132 and the third pixel array unit 133 via one side of the pixel array 130, and are outputted to the timing controller 150 from the opposite side of the pixel array 130. However, the timing controller 150 is not limited to receive the gate signals SG1_n-SG3_n from the opposite side of the pixel array 130. In another embodiment, the timing controller 150 may receive the gate signals SG1_n-SG3_n directly from the gate drivers 121-123.

The first gate pulse modulation unit 161, electrically connected to the timing controller 150 and the first gate driver 121, is utilized for providing the first gate signal modulation voltage VGSM1 furnished to the first gate driver 121 according to the first shaping control signal VFLK1. The second gate pulse modulation unit 162, electrically connected to the timing controller 150 and the second gate driver 122, is utilized for providing the second gate signal modulation voltage VGSM2 furnished to the second gate driver 122 according to the second shaping control signal VFLK2. The third gate pulse modulation unit 163, electrically connected to the timing controller 150 and the third gate driver 123, is utilized for providing the third gate signal modulation voltage VGSM3 furnished to the third gate driver 123 according to the third shaping control signal VFLK3.

Accordingly, in the operation of the liquid crystal display 100, the timing controller 150 is able to adjust the shaping interval lengths of the shaping control signals VFLK1-VFLK3 under feedback control mechanism so that the pulse falling depths of the first through third gate signal sets SG1-SG3 can be substantially equalized regardless of an occurrence of the shaping interval delay difference corresponding to the gate signal modulation voltages VGSM1-VGSM3 received by the gate drivers 121-123 respectively, thereby completely solving the problem of image flickering and color-shift phenomena for significantly enhancing the image quality of the liquid crystal display 100.

Figure 3:
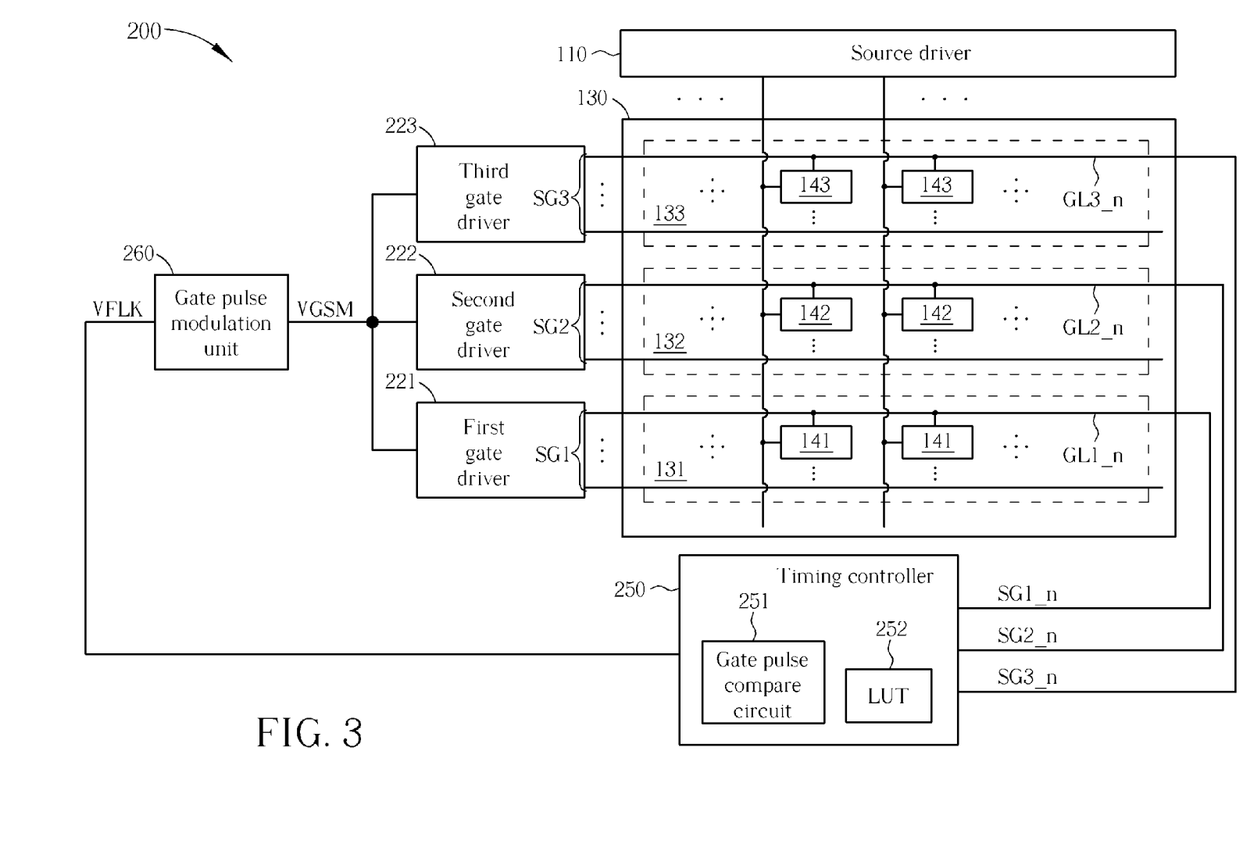
FIG. 3 is a schematic diagram showing a liquid crystal display having adaptive pulse shaping control mechanism in accordance with a second embodiment of the present invention.

FIG. 3 is a schematic diagram showing a liquid crystal display having adaptive pulse shaping control mechanism in accordance with a second embodiment of the present invention. As shown in FIG. 3, the liquid crystal display 200 comprises the source driver 110, a first gate driver 221, a second gate driver 222, a third gate driver 223, the pixel array 130, a timing controller 250, and a gate pulse modulation unit 260. The structure and functionality of the source driver 110 and the pixel array 130 are detailed in the above description of the liquid crystal display 100, and are not repeated here. The first gate driver 221, the second gate driver 222 and the third gate driver 223 are employed to respectively provide the first gate signal set SG1, the second gate signal set SG2 and the third gate signal set SG3 according to a gate signal modulation voltage VGSM.

The timing controller 250 is electrically connected to the pixel array 130 for receiving the first gate signal SG1_n of the first gate signal set SG1, the second gate signal SG2_n of second gate signal set SG2 and the third gate signal SG3_n of the third gate signal set SG3. Further, the timing controller 250 is utilized for performing a gate pulse compare operation over the first gate signal SG1_n, the second gate signal SG2_n and the third gate signal SG3_n so as to dynamically adjust the shaping interval length of a shaping control signal VFLK. The timing controller 250 includes a gate pulse compare circuit 251 for performing the gate pulse compare operation. In the embodiment shown in FIG. 3, the timing controller 250 further comprises a lookup table 252 for providing a relationship between the difference of pulse voltage falling times and the adjusting amount of shaping interval, such that the timing controller 250 is able to dynamically adjust the shaping interval length of the shaping control signal VFLK according to the comparison result of the gate pulse compare circuit 251 in conjunction with the relationship of the lookup table 252. The gate pulse modulation unit 260, electrically connected to the timing controller 250 and the gate drivers 221-223, is utilized for providing the gate signal modulation voltage VGSM furnished to the gate drivers 221-223 according to the shaping control signal VFLK.

In the operation of the liquid crystal display 200, when the first gate driver 221 is enabled to output plural gate pulses of the first gate signal set SG1, the timing controller 250 outputs the shaping control signal VFLK having a first shaping interval, and the gate pulse modulation unit 260 generates the gate signal modulation voltage VGSM furnished to the first gate driver 221 based on the shaping control signal VFLK having the first shaping interval. When the second gate driver 222 is enabled to output plural gate pulses of the second gate signal set SG2, the timing controller 250 outputs the shaping control signal VFLK having a second shaping interval, and the gate pulse modulation unit 260 generates the gate signal modulation voltage VGSM furnished to the second gate driver 222 based on the shaping control signal VFLK having the second shaping interval. When the third gate driver 223 is enabled to output plural gate pulses of the third gate signal set SG3, the timing controller 250 outputs the shaping control signal VFLK having a third shaping interval, and the gate pulse modulation unit 260 generates the gate signal modulation voltage VGSM furnished to the third gate driver 223 based on the shaping control signal VFLK having the third shaping interval.

That is, in the operation of the liquid crystal display 200, the timing controller 250 is able to dynamically adjust the lengths of the first through third shaping intervals of the shaping control signal VFLK under feedback control mechanism so that the pulse falling depths of the first through third gate signal sets SG1-SG3 can be substantially equalized regardless of an occurrence of the shaping interval delay difference while inputting the gate signal modulation voltage VGSM to the gate drivers 221-223, thereby completely solving the problem of image flickering and color-shift phenomena for significantly enhancing the image quality of the liquid crystal display 200. For instance, if the timing controller 250 estimates that the pulse falling depth of the first gate signal SG1_n is greater than that of the third gate signal SG3_n, the first shaping interval is lengthened and/or the third shaping interval is shortened. Thereafter, when the first gate driver 221 is enabled, the timing controller 250 outputs the shaping control signal VFLK having the first shaping interval. And when the third gate driver 223 is enabled, the timing controller 250 outputs the shaping control signal VFLK having the third shaping interval. For that reason, the pulse falling depths of the first gate signal SG1_n and the third gate signal SG3_n can be substantially equalized after performing the shaping interval adjusting operation.

Figure 4:
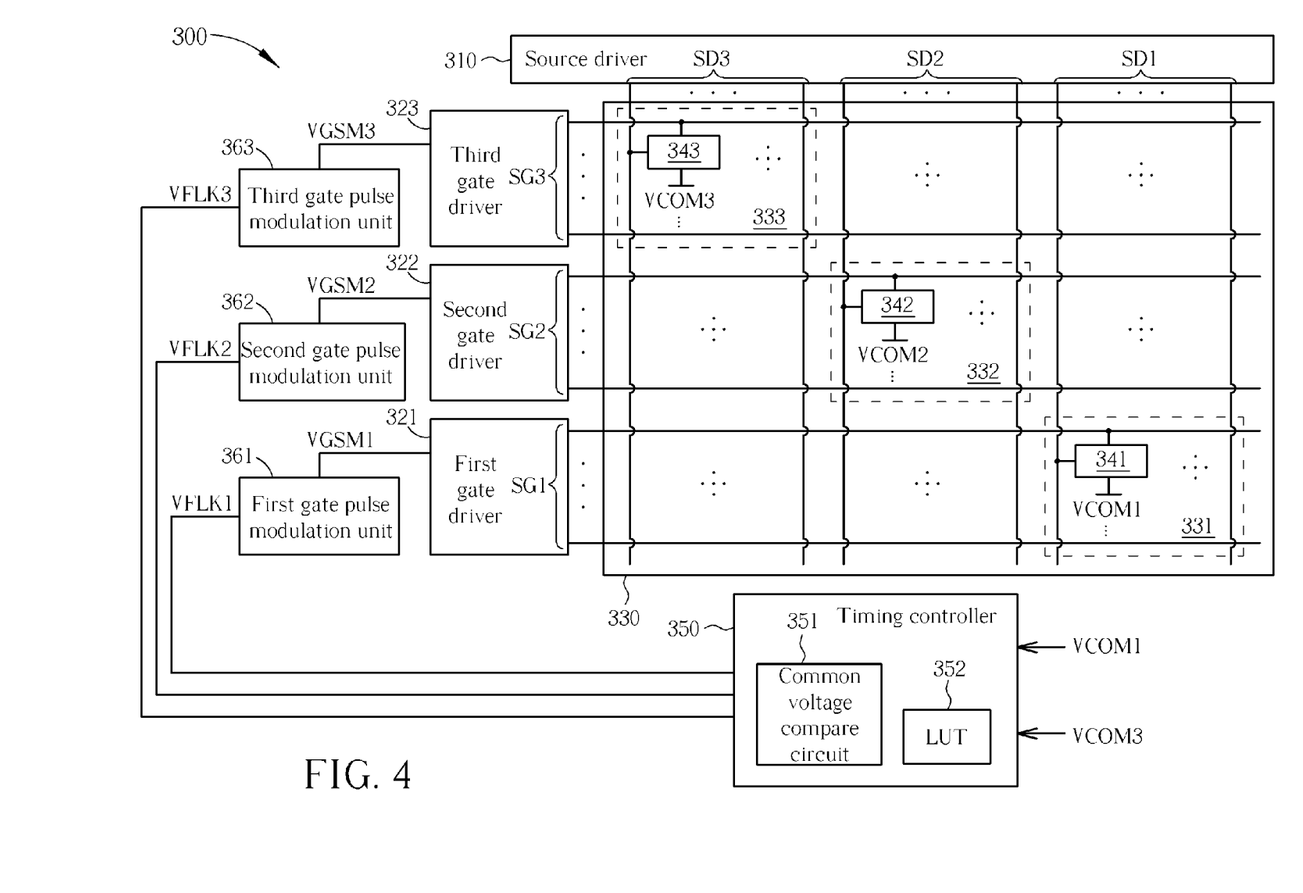
FIG. 4 is a schematic diagram showing a liquid crystal display having adaptive pulse shaping control mechanism in accordance with a third embodiment of the present invention.

FIG. 4 is a schematic diagram showing a liquid crystal display having adaptive pulse shaping control mechanism in accordance with a third embodiment of the present invention.

As shown in FIG. 4, the liquid crystal display 300 comprises a source driver 310, a first gate driver 321, a second gate driver 322, a third gate driver 323, a pixel array 330, a timing controller 350, a first gate pulse modulation unit 361, a second gate pulse modulation unit 362, and a third gate pulse modulation unit 363. The source driver 310 is employed to provide a first data signal set SD1, a second data signal set SD2 and a third data signal set SD3. The first gate driver 321 is utilized for providing a first gate signal set SG1 according to a first gate signal modulation voltage VGSM1. The second gate driver 322 is utilized for providing a second gate signal set SG2 according to a second gate signal modulation voltage VGSM2. The third gate driver 323 is utilized for providing a third gate signal set SG3 according to a third gate signal modulation voltage VGSM3. The pixel array 330 includes a first pixel array unit 331, a second pixel array unit 332 and a third pixel array unit 333. The first pixel array unit 331, electrically connected to the source driver 310 and the first gate driver 321, comprises a plurality of first pixel units 341 for illustrating image according to the first data signal set SD1, the first gate signal set SG1 and a first common voltage VCOM1. The second pixel array unit 332, electrically connected to the source driver 310 and the second gate driver 322, comprises a plurality of second pixel units 342 for illustrating image according to the second data signal set SD2, the second gate signal set SG2 and a second common voltage VCOM2. The third pixel array unit 333, electrically connected to the source driver 310 and the third gate driver 323, comprises a plurality of third pixel units 343 for illustrating image according to the third data signal set SD3, the third gate signal set SG3 and a third common voltage VCOM3.

The timing controller 350 is electrically connected to the pixel array 330 for receiving the first common voltage VCOM1 and the third common voltage VCOM3. Further, the timing controller 350 is utilized for performing a common voltage compare operation over the first common voltage VCOM1 and the third common voltage VCOM3 so as to adjust the shaping interval lengths of a first shaping control signal VFLK1, a second shaping control signal VFLK2 and a third shaping control signal VFLK3. That is, the timing controller 350 is employed to estimate the shaping interval delay difference of inputting the shaping control signals VFLK1-VFLK3 respectively to the gate pulse modulation units 361-363 based on the transmission voltage drop difference between the first common voltage VCOM1 and the third common voltage VCOM3, and further to adjust the shaping interval lengths of the shaping control signals VFLK1-VFLK3 accordingly. The timing controller 350 includes a common voltage compare circuit 351 for performing the common voltage compare operation. In another embodiment, the timing controller 350 receives the first common voltage VCOM1, the second common voltage VCOM2 and the third common voltage VCOM3 and is employed to perform a common voltage compare operation over the common voltages VCOM1-VCOM3 for adjusting the shaping interval lengths of the shaping control signals VFLK1-VFLK3. In the embodiment shown in FIG. 4, the timing controller 350 further comprises a lookup table 352 for providing a relationship between the transmission voltage drop difference of common voltages and the adjusting amount of shaping interval, such that the timing controller 350 may generate the shaping control signals VFLK1-VFLK3 according to the comparison result of the common voltage compare circuit 351 in conjunction with the relationship of the lookup table 352. In other words, the timing controller 350 may adjust a shaping interval difference between two of the shaping control signals VFLK1-VFLK3 according to a voltage difference between two of the common voltages VCOM1-VCOM3.

The first gate pulse modulation unit 361, electrically connected to the timing controller 350 and the first gate driver 321, is utilized for providing the first gate signal modulation voltage VGSM1 furnished to the first gate driver 321 according to the first shaping control signal VFLK1. The second gate pulse modulation unit 362, electrically connected to the timing controller 350 and the second gate driver 322, is utilized for providing the second gate signal modulation voltage VGSM2 furnished to the second gate driver 322 according to the second shaping control signal VFLK2. The third gate pulse modulation unit 363, electrically connected to the timing controller 350 and the third gate driver 323, is utilized for providing the third gate signal modulation voltage VGSM3 furnished to the third gate driver 323 according to the third shaping control signal VFLK3.

In summary, regarding the operation of the liquid crystal display 300, the timing controller 350 is capable of adjusting the shaping interval lengths of the shaping control signals VFLK1-VFLK3 according to an estimation of the shaping interval delay difference of inputting the shaping control signals VFLK1-VFLK3 respectively to the gate pulse modulation units 361-363 through analyzing the transmission voltage drop difference between the first common voltage VCOM1 and the third common voltage VCOM3, such that the pulse falling depths of the first through third gate signal sets SG1-SG3 can be substantially equalized regardless of an occurrence of the shaping interval delay difference corresponding to the gate signal modulation voltages VGSM1-VGSM3 received by the gate drivers 321-323 respectively, thereby completely solving the problem of image flickering and color-shift phenomena for significantly enhancing the image quality of the liquid crystal display 300.

Figure 5:
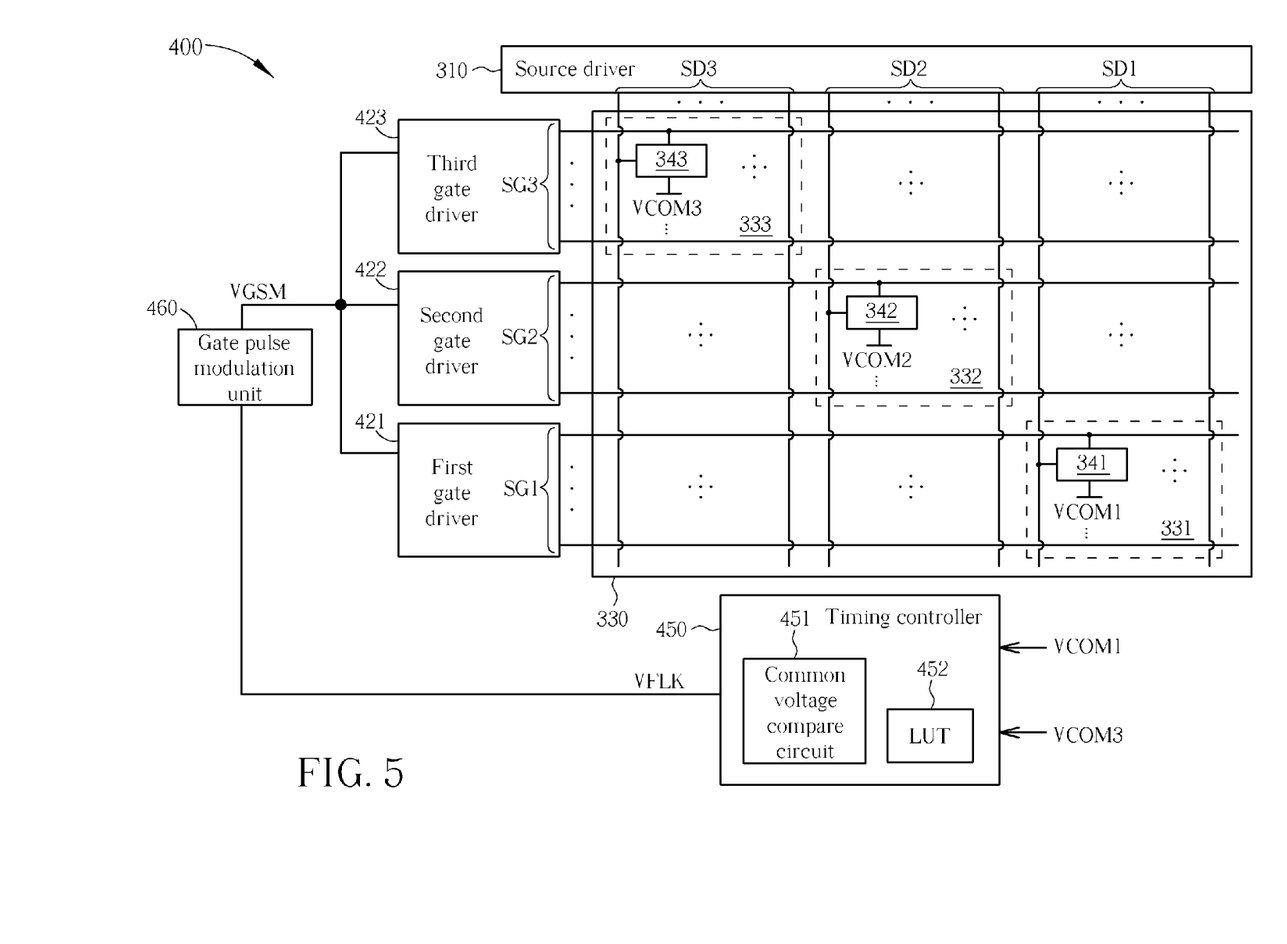
FIG. 5 is a schematic diagram showing a liquid crystal display having adaptive pulse shaping control mechanism in accordance with a fourth embodiment of the present invention.

FIG. 5 is a schematic diagram showing a liquid crystal display having adaptive pulse shaping control mechanism in accordance with a fourth embodiment of the present invention. As shown in FIG. 5, the liquid crystal display 400 comprises the source driver 310, a first gate driver 421, a second gate driver 422, a third gate driver 423, the pixel array 330, a timing controller 450, and a gate pulse modulation unit 460. The structure and functionality of the source driver 310 and the pixel array 330 are detailed in the above description of the liquid crystal display 300, and are not repeated here. The first gate driver 421, the second gate driver 422 and the third gate driver 423 are employed to respectively provide the first gate signal set SG1, the second gate signal set SG2 and the third gate signal set SG3 according to a gate signal modulation voltage VGSM.

The timing controller 450 is electrically connected to the pixel array 330 for receiving the first common voltage VCOM1 and the third common voltage VCOM3. Further, the timing controller 450 is utilized for performing a common voltage compare operation over the first common voltage VCOM1 and the third common voltage VCOM3 so as to dynamically adjust the shaping interval length of a shaping control signal VFLK. That is, the timing controller 450 is employed to estimate the shaping interval delay difference of inputting the gate signal modulation voltage VGSM to the gate drivers 421-423 based on the transmission voltage drop difference between the first common voltage VCOM1 and the third common voltage VCOM3, and further to dynamically adjust the shaping interval length of the shaping control signal VFLK accordingly. The timing controller 450 includes a common voltage compare circuit 451 for performing the common voltage compare operation. In another embodiment, the timing controller 450 receives the first common voltage VCOM1, the second common voltage VCOM2 and the third common voltage VCOM3 and is employed to perform a common voltage compare operation over the common voltages VCOM1-VCOM3 for dynamically adjusting the shaping interval length of the shaping control signal VFLK. In the embodiment shown in FIG. 5, the timing controller 450 further comprises a lookup table 452 for providing a relationship between the transmission voltage drop difference of common voltages and the adjusting amount of shaping interval, such that the timing controller 450 is able to dynamically adjust the shaping interval length of the shaping control signal VFLK according to the comparison result of the common voltage compare circuit 451 in conjunction with the relationship of the lookup table 452. The gate pulse modulation unit 460, electrically connected to the timing controller 450 and the gate drivers 421-423, is utilized for providing the gate signal modulation voltage VGSM furnished to the gate drivers 421-423 according to the shaping control signal VFLK.

In the operation of the liquid crystal display 400, when the first gate driver 421 is enabled to output plural gate pulses of the first gate signal set SG1, the timing controller 450 outputs the shaping control signal VFLK having a first shaping interval, and the gate pulse modulation unit 460 generates the gate signal modulation voltage VGSM furnished to the first gate driver 421 based on the shaping control signal VFLK having the first shaping interval. When the second gate driver 422 is enabled to output plural gate pulses of the second gate signal set SG2, the timing controller 450 outputs the shaping control signal VFLK having a second shaping interval, and the gate pulse modulation unit 460 generates the gate signal modulation voltage VGSM furnished to the second gate driver 422 based on the shaping control signal VFLK having the second shaping interval. When the third gate driver 423 is enabled to output plural gate pulses of the third gate signal set SG3, the timing controller 450 outputs the shaping control signal VFLK having a third shaping interval, and the gate pulse modulation unit 460 generates the gate signal modulation voltage VGSM furnished to the third gate driver 423 based on the shaping control signal VFLK having the third shaping interval.

That is, in the operation of the liquid crystal display 400, the timing controller 450 is capable of dynamically adjusting the lengths of the first through third shaping intervals of the shaping control signal VFLK according to an estimation of the shaping interval delay difference of inputting the gate signal modulation voltages VGSM to the gate drivers 421-423 through analyzing the transmission voltage drop difference between the first common voltage VCOM1 and the third common voltage VCOM3, such that the pulse falling depths of the first through third gate signal sets SG1-SG3 can be substantially equalized regardless of an occurrence of the shaping interval delay difference while inputting the gate signal modulation voltage VGSM to the gate drivers 421-423, thereby completely solving the problem of image flickering and color-shift phenomena for significantly enhancing the image quality of the liquid crystal display 400.

Figure 6:
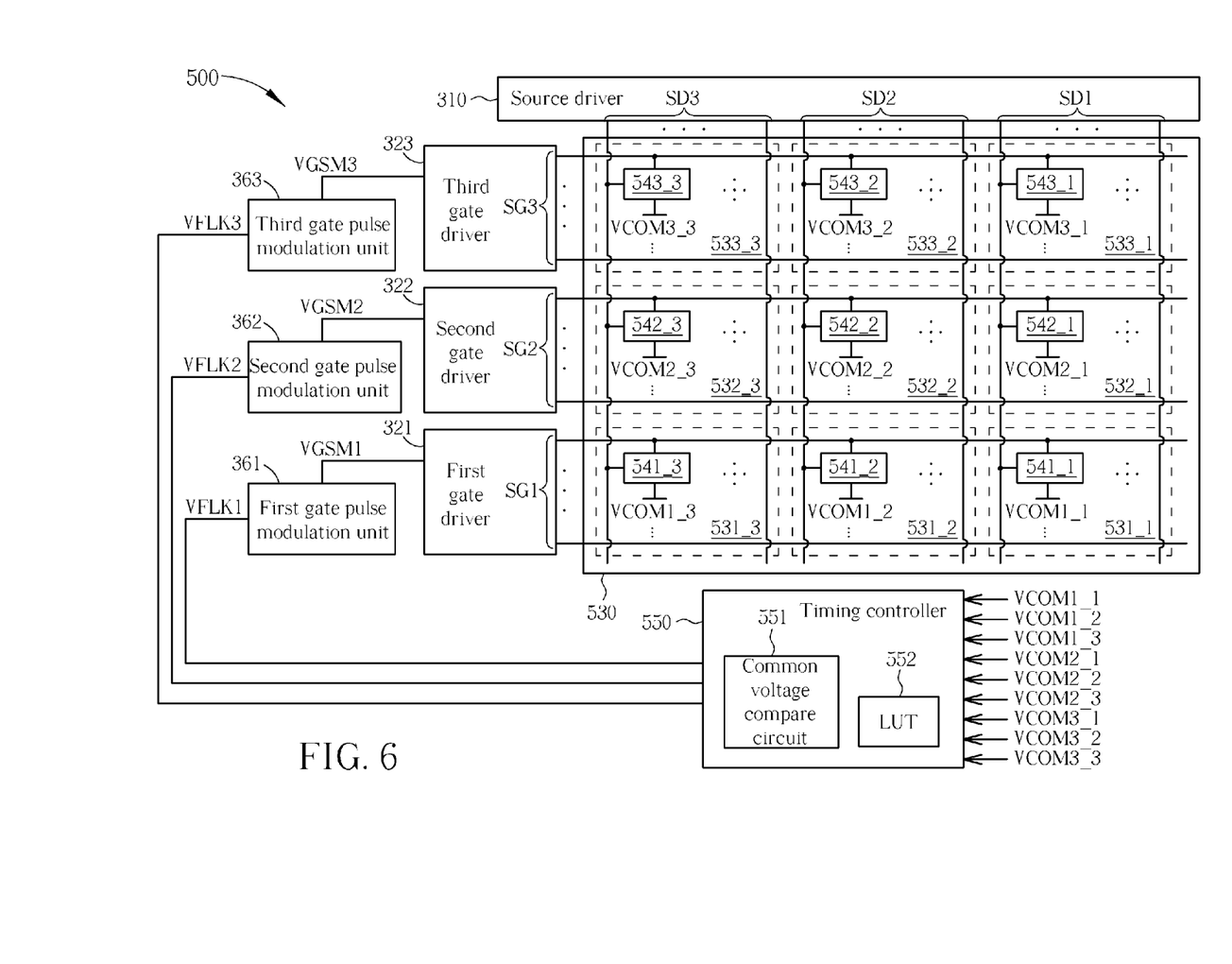
FIG. 6 is a schematic diagram showing a liquid crystal display having adaptive pulse shaping control mechanism in accordance with a fifth embodiment of the present invention.

FIG. 6 is a schematic diagram showing a liquid crystal display having adaptive pulse shaping control mechanism in accordance with a fifth embodiment of the present invention. As shown in FIG. 6, the liquid crystal display 500 is similar to the liquid crystal display 300 illustrated in FIG. 4, differing in that the pixel array 330 is replaced with a pixel array 530 and the timing controller 350 is replaced with a timing controller 550. The pixel array 530 includes a plurality of pixel array unit 531_1-533_3. The pixel array unit 531_1, electrically connected to the source driver 310 and the first gate driver 321, comprises a plurality of pixel units 541_1 for illustrating image according to the first data signal set SD1, the first gate signal set SG1 and a common voltage VCOM1_1. The pixel array unit 531_2, electrically connected to the source driver 310 and the first gate driver 321, comprises a plurality of pixel units 541_2 for illustrating image according to the second data signal set SD2, the first gate signal set SG1 and a common voltage VCOM1_2. The pixel array unit 531_3, electrically connected to the source driver 310 and the first gate driver 321, comprises a plurality of pixel units 541_3 for illustrating image according to the third data signal set SD3, the first gate signal set SG1 and a common voltage VCOM1_3. The structure and functionality of other pixel array units 532_1-533_3 can be inferred by analogy.

The timing controller 550 is electrically connected to the pixel array 530 for receiving the common voltages VCOM1_1-VCOM3_3. Further, the timing controller 550 is utilized for performing a common voltage compare operation over the common voltages VCOM1_1-VCOM3_3 so as to adjust the shaping interval lengths of the first shaping control signal VFLK1, the second shaping control signal VFLK2 and the third shaping control signal VFLK3. That is, the timing controller 550 is employed to estimate the shaping interval delay difference of inputting the shaping control signals VFLK1-VFLK3 respectively to the gate pulse modulation units 361-363 based on the transmission voltage drop difference of the common voltages VCOM1_1-VCOM3_3, and further to adjust the shaping interval lengths of the shaping control signals VFLK1-VFLK3 accordingly. The timing controller 550 includes a common voltage compare circuit 551 for performing the common voltage compare operation. In another embodiment, the timing controller 550 receives a common voltage set formed by part of the common voltages VCOM1_1-VCOM3_3 and is employed to perform a common voltage compare operation over the common voltages of the common voltage set for adjusting the shaping interval lengths of the shaping control signals VFLK1-VFLK3. In the embodiment shown in FIG. 6, the timing controller 550 further comprises a lookup table 552 for providing a relationship between the transmission voltage drop difference of common voltages and the adjusting amount of shaping interval, such that the timing controller 550 may generate the shaping control signals VFLK1-VFLK3 according to the comparison result of the common voltage compare circuit 551 in conjunction with the relationship of the lookup table 552.

Accordingly, in the operation of the liquid crystal display 500, the timing controller 550 is capable of adjusting the shaping interval lengths of the shaping control signals VFLK1-VFLK3 according to an estimation of the shaping interval delay difference of inputting the shaping control signals VFLK1-VFLK3 respectively to the gate pulse modulation units 361-363 through analyzing the transmission voltage drop difference of the common voltages VCOM1_1-VCOM3_3, such that the pulse falling depths of the first through third gate signal sets SG1-SG3 can be substantially equalized regardless of an occurrence of the shaping interval delay difference while inputting the shaping control signals VFLK1-VFLK3 respectively to the gate pulse modulation units 361-363, thereby completely solving the problem of image flickering and color-shift phenomena for significantly enhancing the image quality of the liquid crystal display 500.

Figure 7:
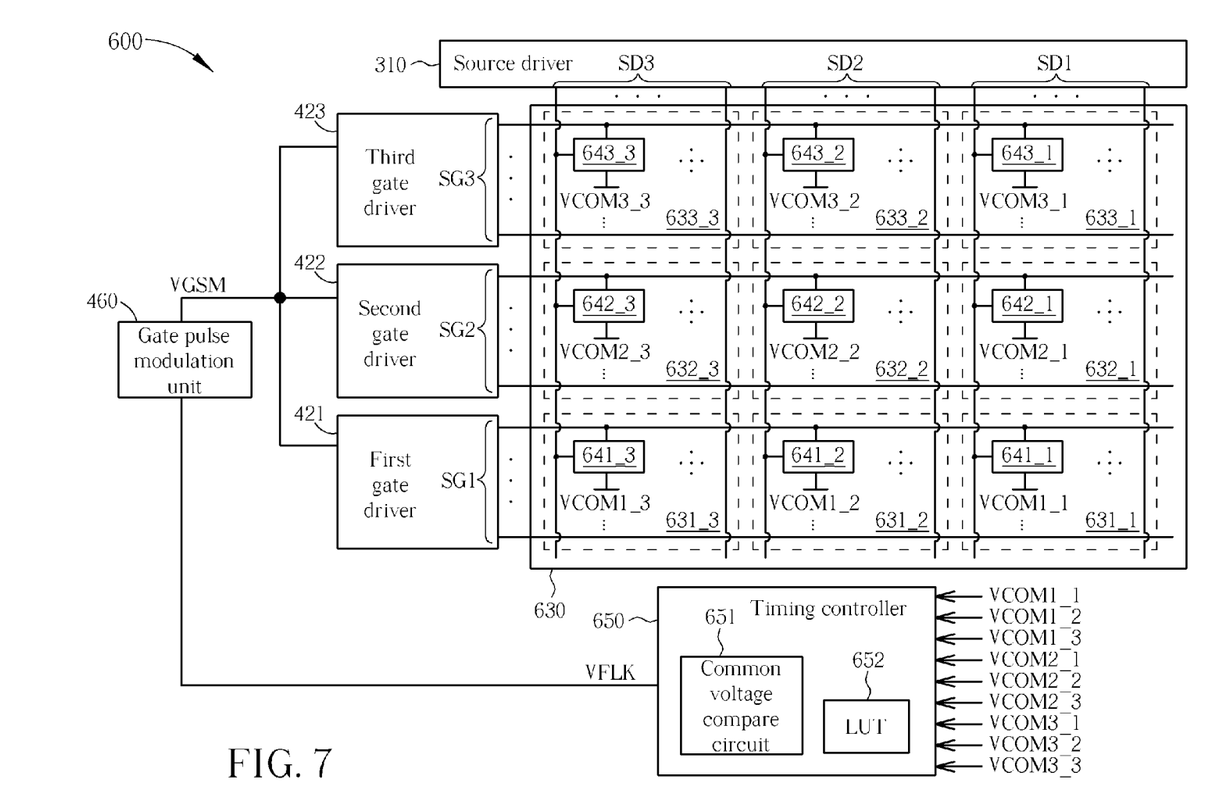
FIG. 7 is a schematic diagram showing a liquid crystal display having adaptive pulse shaping control mechanism in accordance with a sixth embodiment of the present invention.

FIG. 7 is a schematic diagram showing a liquid crystal display having adaptive pulse shaping control mechanism in accordance with a sixth embodiment of the present invention. As shown in FIG. 7, the liquid crystal display 600 is similar to the liquid crystal display 400 illustrated in FIG. 5, differing in that the pixel array 330 is replaced with a pixel array 630 and the timing controller 450 is replaced with a timing controller 650. The pixel array 630 includes a plurality of pixel array unit 631_1-633_3. The pixel array unit 631_1, electrically connected to the source driver 310 and the first gate driver 421, comprises a plurality of pixel units 641_1 for illustrating image according to the first data signal set SD1, the first gate signal set SG1 and a common voltage VCOM1_1. The pixel array unit 631_2, electrically connected to the source driver 310 and the first gate driver 421, comprises a plurality of pixel units 641_2 for illustrating image according to the second data signal set SD2, the first gate signal set SG1 and a common voltage VCOM1_2. The pixel array unit 631_3, electrically connected to the source driver 310 and the first gate driver 421, comprises a plurality of pixel units 641_3 for illustrating image according to the third data signal set SD3, the first gate signal set SG1 and a common voltage VCOM1_3. The structure and functionality of other pixel array units 632_1-633_3 can be inferred by analogy.

The timing controller 650 is electrically connected to the pixel array 630 for receiving the common voltages VCOM1_1-VCOM3_3. Further, the timing controller 650 is utilized for performing a common voltage compare operation over the common voltages VCOM1_1-VCOM3_3 so as to dynamically adjust the shaping interval length of the shaping control signal VFLK. That is, the timing controller 650 is employed to estimate the shaping interval delay difference of inputting the gate signal modulation voltages VGSM to the gate drivers 421-423 based on the transmission voltage drop difference of the common voltages VCOM1_1-VCOM3_3, and further to dynamically adjust the shaping interval length of the shaping control signal VFLK accordingly. The timing controller 650 includes a common voltage compare circuit 651 for performing the common voltage compare operation. In another embodiment, the timing controller 650 receives a common voltage set formed by part of the common voltages VCOM1_1-VCOM3_3 and is employed to perform a common voltage compare operation over the common voltages of the common voltage set for dynamically adjusting the shaping interval length of the shaping control signal VFLK. In the embodiment shown in FIG. 7, the timing controller 650 further comprises a lookup table 652 for providing a relationship between the transmission voltage drop difference of common voltages and the adjusting amount of shaping interval, such that the timing controller 650 is able to dynamically adjust the shaping interval length of the shaping control signal VFLK according to the comparison result of the common voltage compare circuit 651 in conjunction with the relationship of the lookup table 652.

In the operation of the liquid crystal display 600, when the first gate driver 421 is enabled to output plural gate pulses of the first gate signal set SG1, the timing controller 650 outputs the shaping control signal VFLK having a first shaping interval, and the gate pulse modulation unit 460 generates the gate signal modulation voltage VGSM furnished to the first gate driver 421 based on the shaping control signal VFLK having the first shaping interval. When the second gate driver 422 is enabled to output plural gate pulses of the second gate signal set SG2, the timing controller 650 outputs the shaping control signal VFLK having a second shaping interval, and the gate pulse modulation unit 460 generates the gate signal modulation voltage VGSM furnished to the second gate driver 422 based on the shaping control signal VFLK having the second shaping interval. When the third gate driver 423 is enabled to output plural gate pulses of the third gate signal set SG3, the timing controller 650 outputs the shaping control signal VFLK having a third shaping interval, and the gate pulse modulation unit 460 generates the gate signal modulation voltage VGSM furnished to the third gate driver 423 based on the shaping control signal VFLK having the third shaping interval.

With the above in mind, in the operation of the liquid crystal display 600, the timing controller 650 is capable of dynamically adjusting the lengths of the first through third shaping intervals of the shaping control signal VFLK according to an estimation of the shaping interval delay difference of inputting the gate signal modulation voltages VGSM to the gate drivers 421-423 through analyzing the transmission voltage drop difference of the common voltages VCOM1_1-VCOM3_3, such that the pulse falling depths of the first through third gate signal sets SG1-SG3 can be substantially equalized regardless of an occurrence of the shaping interval delay difference while inputting the gate signal modulation voltage VGSM to the gate drivers 421-423, thereby completely solving the problem of image flickering and color-shift phenomena for significantly enhancing the image quality of the liquid crystal display 600.

Figure 8:
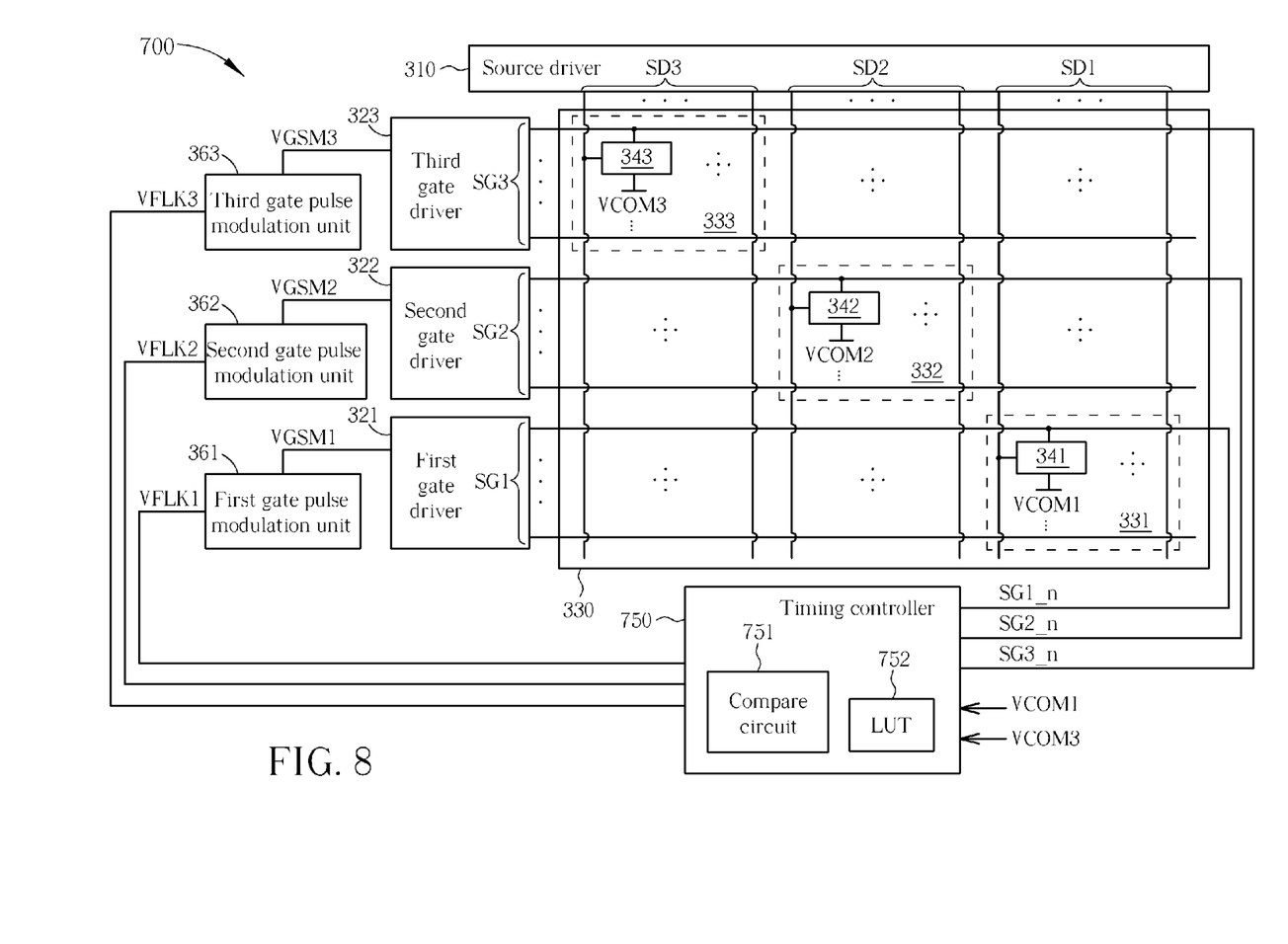
FIG. 8 is a schematic diagram showing a liquid crystal display having adaptive pulse shaping control mechanism in accordance with a seventh embodiment of the present invention.

FIG. 8 is a schematic diagram showing a liquid crystal display having adaptive pulse shaping control mechanism in accordance with a seventh embodiment of the present invention. As shown in FIG. 8, the liquid crystal display 700 is similar to the liquid crystal display 300 illustrated in FIG. 4, differing in that the timing controller 350 is replaced with a timing controller 750. The timing controller 750 is electrically connected to the pixel array 330 for receiving the first gate signal SG1_n of the first gate signal set SG1, the second gate signal SG2_n of the second gate signal set SG2, the third gate signal SG3_n of the third gate signal set SG3, the first common voltage VCOM1 and the third common voltage VCOM3. Further, the timing controller 750 is utilized for performing a gate pulse compare operation over the first through third gate signals SG1_n-SG3_n and performing a common voltage compare operation over the first common voltage VCOM1 and the third common voltage VCOM3 so as to adjust the shaping interval lengths of the shaping control signals VFLK1-VFLK3. That is, the timing controller 750 is employed to adjust the shaping interval lengths of the shaping control signals VFLK1-VFLK3 based on the difference of the pulse voltage falling times of the first through third gate signals SG1_n-SG3_n in conjunction with the transmission voltage drop difference between the first common voltage VCOM1 and the third common voltage VCOM3.

The timing controller 750 includes a compare circuit 751 for performing the gate pulse compare operation and the common voltage compare operation. In another embodiment, the timing controller 750 receives the first through third gate signals SG1_n-SG3_n and the first through third common voltages VCOM1-VCOM3, and is utilized for performing a gate pulse compare operation over the first through third gate signals SG1_n-SG3_n and performing a common voltage compare operation over the first through third common voltages VCOM1-VCOM3 so as to adjust the shaping interval lengths of the shaping control signals VFLK1-VFLK3. In the embodiment shown in FIG. 8, the timing controller 750 further comprises a lookup table 752 for providing a relationship regarding the difference of pulse voltage falling times, the transmission voltage drop difference of common voltages, and the adjusting amount of shaping interval, such that the timing controller 750 may generate the shaping control signals VFLK1-VFLK3 according to the comparison result of the common voltage compare circuit 751 in conjunction with the relationship of the lookup table 752.

That is, in the operation of the liquid crystal display 700, the timing controller 750 is capable of adjusting the shaping interval lengths of the shaping control signals VFLK1-VFLK3 according to the pulse voltage falling time difference of the first through third gate signals SG1_n-SG3_n in conjunction with the transmission voltage drop difference between the first common voltage VCOM1 and the third common voltage VCOM3, such that the pulse falling depths of the first through third gate signal sets SG1-SG3 can be substantially equalized regardless of an occurrence of the shaping interval delay difference while inputting the shaping control signals VFLK1-VFLK3 respectively to the gate pulse modulation units 361-363, thereby completely solving the problem of image flickering and color-shift phenomena for significantly enhancing the image quality of the liquid crystal display 700.

Figure 9:
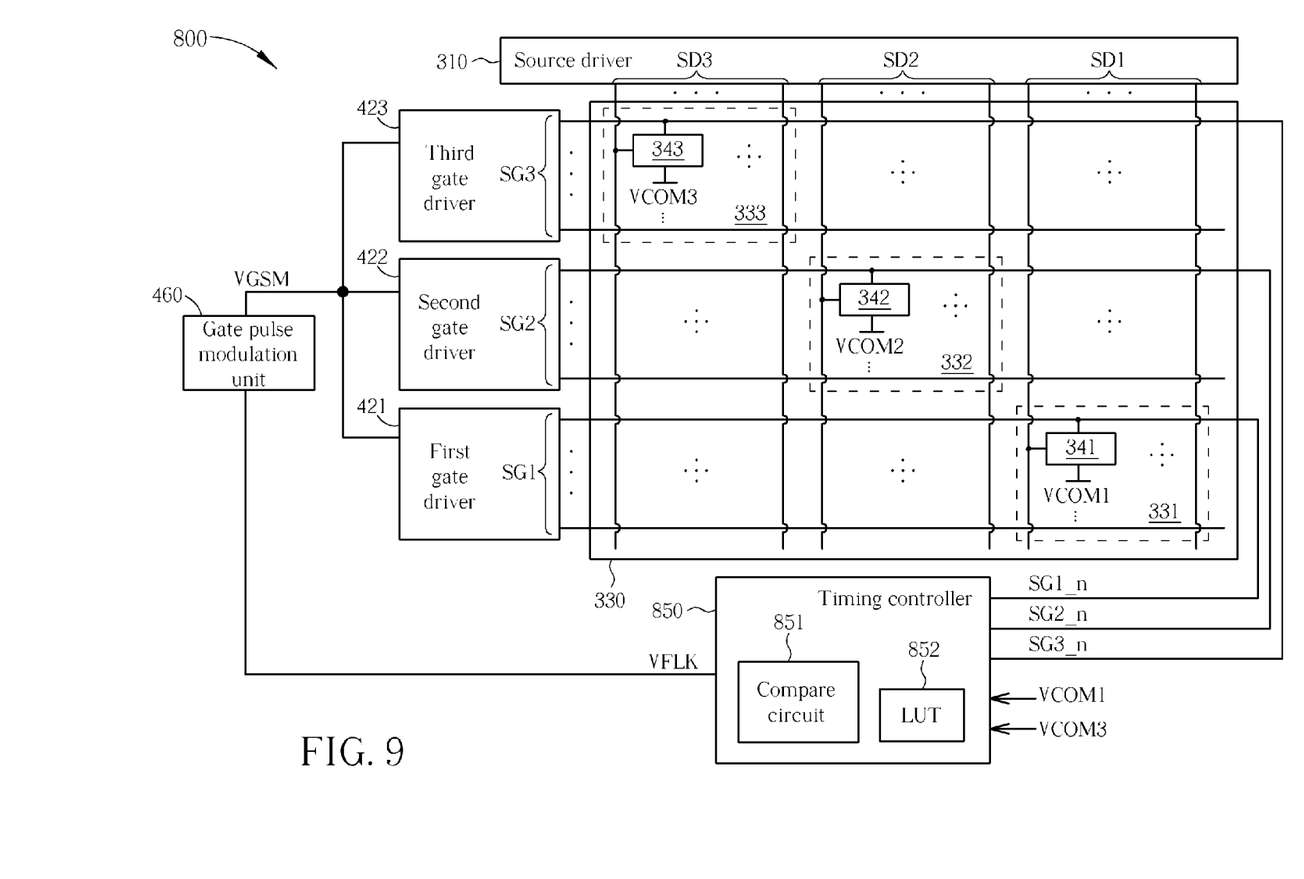
FIG. 9 is a schematic diagram showing a liquid crystal display having adaptive pulse shaping control mechanism in accordance with an eighth embodiment of the present invention.

FIG. 9 is a schematic diagram showing a liquid crystal display having adaptive pulse shaping control mechanism in accordance with an eighth embodiment of the present invention. As shown in FIG. 9, the liquid crystal display 800 is similar to the liquid crystal display 400 illustrated in FIG. 5, differing in that the timing controller 450 is replaced with a timing controller 850. The timing controller 850 is electrically connected to the pixel array 330 for receiving the first gate signal SG1_n of the first gate signal set SG1, the second gate signal SG2_n of the second gate signal set SG2, the third gate signal SG3_n of the third gate signal set SG3, the first common voltage VCOM1 and the third common voltage VCOM3. Further, the timing controller 850 is utilized for performing a gate pulse compare operation over the first through third gate signals SG1_n-SG3_n and performing a common voltage compare operation over the first common voltage VCOM1 and the third common voltage VCOM3 so as to dynamically adjust the shaping interval length of the shaping control signal VFLK. That is, the timing controller 850 is employed to dynamically adjust the shaping interval length of the shaping control signal VFLK based on the difference of the pulse voltage falling times of the first through third gate signals SG1_n-SG3_n in conjunction with the transmission voltage drop difference between the first common voltage VCOM1 and the third common voltage VCOM3.

The timing controller 850 includes a compare circuit 851 for performing the gate pulse compare operation and the common voltage compare operation. In another embodiment, the timing controller 850 receives the first through third gate signals SG1_n-SG3_n and the first through third common voltages VCOM1-VCOM3, and is utilized for performing a gate pulse compare operation over the first through third gate signals SG1_n-SG3_n and performing a common voltage compare operation over the first through third common voltages VCOM1-VCOM3 so as to dynamically adjust the shaping interval length of the shaping control signal VFLK. In the embodiment shown in FIG. 9, the timing controller 850 further comprises a lookup table 852 for providing a relationship regarding the difference of pulse voltage falling times, the transmission voltage drop difference of common voltages, and the adjusting amount of shaping interval, such that the timing controller 850 is able to dynamically adjust the shaping interval length of the shaping control signal VFLK according to the comparison result of the common voltage compare circuit 851 in conjunction with the relationship of the lookup table 852.

In the operation of the liquid crystal display 800, when the first gate driver 421 is enabled to output plural gate pulses of the first gate signal set SG1, the timing controller 850 outputs the shaping control signal VFLK having a first shaping interval, and the gate pulse modulation unit 460 generates the gate signal modulation voltage VGSM furnished to the first gate driver 421 based on the shaping control signal VFLK having the first shaping interval. When the second gate driver 422 is enabled to output plural gate pulses of the second gate signal set SG2, the timing controller 850 outputs the shaping control signal VFLK having a second shaping interval, and the gate pulse modulation unit 460 generates the gate signal modulation voltage VGSM furnished to the second gate driver 422 based on the shaping control signal VFLK having the second shaping interval. When the third gate driver 423 is enabled to output plural gate pulses of the third gate signal set SG3, the timing controller 850 outputs the shaping control signal VFLK having a third shaping interval, and the gate pulse modulation unit 460 generates the gate signal modulation voltage VGSM furnished to the third gate driver 423 based on the shaping control signal VFLK having the third shaping interval.

That is, in the operation of the liquid crystal display 800, the timing controller 850 is capable of dynamically adjusting the lengths of the first through third shaping intervals of the shaping control signal VFLK according to the pulse voltage falling time difference of the first through third gate signals SG1_n-SG3_n in conjunction with the transmission voltage drop difference between the first common voltage VCOM1 and the third common voltage VCOM3, such that the pulse falling depths of the first through third gate signal sets SG1-SG3 can be substantially equalized regardless of an occurrence of the shaping interval delay difference while inputting the gate signal modulation voltage VGSM to the gate drivers 421-423, thereby completely solving the problem of image flickering and color-shift phenomena for significantly enhancing the image quality of the liquid crystal display 800.

To sum up, in the operation of the liquid crystal display according to the present invention, the pulse falling depths of gate signals can be substantially equalized based on the pulse voltage falling time difference of gate signals and/or based on the transmission voltage drop difference of common voltages, for completely solving the problem of image flickering and color-shift phenomena so as to significantly enhance the image quality of the liquid crystal display.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A liquid crystal display, comprising:
  a source driver for providing plural data signals;
  a first gate driver for providing a first gate signal set according to a first gate signal modulation voltage;
  a second gate driver for providing a second gate signal set according to a second gate signal modulation voltage;
  a pixel array comprising a first pixel array unit and a second pixel array unit, the first pixel array unit being electrically connected to the source driver and the first gate driver for illustrating image according to the data signals, the first gate signal set, and a first common voltage, and the second pixel array unit being electrically connected to the source driver and the second gate driver for illustrating image according to the data signals, the second gate signal set, and a second common voltage;
  a timing controller, electrically connected to the pixel array, to generate a first gate signal of the first gate signal set, a second gate signal of the second gate signal set, and the first and second common voltages, and for performing a gate pulse compare operation over the first gate signal and the second gate signal and performing a common voltage compare operation over the first and second common voltages so as to generate a first shaping control signal and a second shaping control signal;
  a first gate pulse modulation unit, electrically connected to the timing controller and the first gate driver, for providing the first gate signal modulation voltage furnished to the first gate driver according to the first shaping control signal; and
  a second gate pulse modulation unit, electrically connected to the timing controller and the second gate driver, for providing the second gate signal modulation voltage furnished to the second gate driver according to the second shaping control signal;
  wherein the timing controller is configured to adjust a shaping interval difference between the first and second shaping control signals according to a pulse voltage falling time difference between the first and second gate signals in conjunction with a voltage difference between the first and second common voltages.

2. The liquid crystal display of claim 1, further comprising:
  a third gate driver for providing a third gate signal set according to a third gate signal modulation voltage; and
  a third gate pulse modulation unit, electrically connected to the timing controller and the third gate driver, for providing the third gate signal modulation voltage furnished to the third gate driver according to a third shaping control signal; wherein the pixel array further comprises a third pixel array unit disposed between the first and second pixel array units, the third pixel array unit being electrically connected to the source driver and the third gate driver for illustrating image according to the data signals and the third gate signal set, and the timing controller is further for receiving a third gate signal of the third gate signal set and for performing a gate pulse compare operation over the first through third gate signals so as to generate the first through third shaping control signals.

3. The liquid crystal display of claim 2, wherein the timing controller comprises a gate pulse compare circuit for performing the gate pulse compare operation over the first through third gate signals.

4. The liquid crystal display of claim 1, wherein the timing controller comprises a gate pulse compare circuit for performing the gate pulse compare operation over the first and second gate signals.

5. The liquid crystal display of claim 1, wherein a first shaping interval of the first shaping control signal is longer than a second shaping interval of the second shaping control signal if a first pulse voltage falling time of the first gate signal is shorter than a second pulse voltage falling time of the second gate signal.

6. The liquid crystal display of claim 5, wherein the timing controller comprises a lookup table for providing a relationship between a difference of the first and second pulse voltage falling times and an adjusting amount of the first shaping interval and/or the second shaping interval.

7. The liquid crystal display of claim 1, wherein the timing controller comprises a compare circuit for performing the gate pulse compare operation over the first and second gate signals and performing the common voltage compare operation over the first and second common voltages.

* * * * *